United States Patent [19]

Natansohn et al.

[11] 4,374,713
[45] Feb. 22, 1983

[54] PROCESS FOR SEPARATING TUNGSTEN FROM COINAGE METALS

[75] Inventors: Samuel Natansohn, Sharon; Gary Czupryna, Salem, both of Mass.

[73] Assignee: GTE Laboratories Incorporated, Waltham, Mass.

[21] Appl. No.: 269,191

[22] Filed: Jun. 1, 1981

[51] Int. Cl.³ .............................. C25C 1/08; C25C 1/20
[52] U.S. Cl. .................................. 204/109; 204/106; 204/112
[58] Field of Search .................. 75/101 BE; 204/109, 204/106, 112

[56] References Cited

U.S. PATENT DOCUMENTS 3,733,256  5/1973  Anderson .......................... 204/109

Primary Examiner—R. L. Andrews
Attorney, Agent, or Firm—Jerry F. Janssen

[57] ABSTRACT

A process for cleanly separating tungsten and the coinage metals from alloys or mixtures thereof comprises electrowinning the coinage metal from an electrolyte solution which is maintained substantially free of tungsten contamination by contacting the electrolyte solution with an organic extractant to remove the tungsten. A preferred extractant solution comprises a quaternary alkyl ammonium salt or quaternary alkyl phosphonium salt dissolved in an inert organic solvent.

8 Claims, 1 Drawing Figure

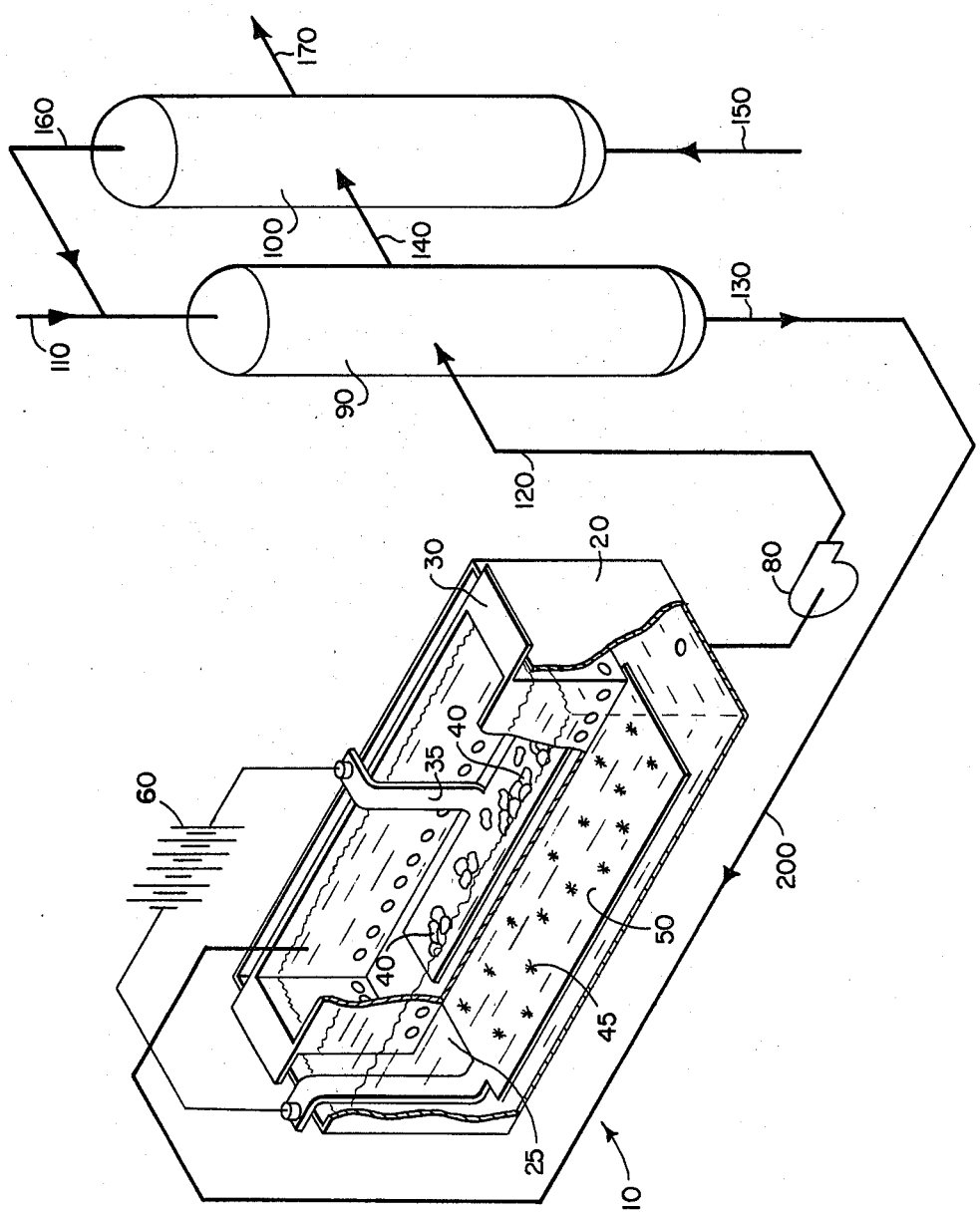

PROCESS FOR SEPARATING TUNGSTEN FROM COINAGE METALS

BACKGROUND OF THE INVENTION

This invention relates to processes for separating metals. More particularly, it is concerned with a process for separating tungsten from coinage metals, notably silver, during electrowinning.

In the manufacture of electrical switchgear equipment, relays, motor controllers and the like, composites or alloys of tungsten and coinage metals, especially silver, are used as electrical contact points. Cost considerations dictate that both tungsten and silver be recovered from any scrap generated by the manufacturing process.

It has been the practice in the art to recover silver or other coinage metal from tungsten-containing alloys by conventional electrowinning processes. A major drawback of such methods, however, is the codeposition of tungsten with the coinage metal at the cathode of the electrowinning cell resulting in unwanted contamination of the recovered coinage metal by tungsten.

SUMMARY OF THE INVENTION

It has been found, however, in accordance with the present invention that silver or other coinage metal can be cleanly separated from tungsten-containing alloys in an electrowinning process which includes continuous or batch extraction of tungsten from the electrolyte solution by liquid-liquid extraction during the electrowinning process. In accordance with the present invention, a process for separately recovering tungsten and a coinage metal from alloys or mixtures thereof comprises electrowinning the coinage metal from an electrolyte solution contained in an electrowinning cell having an anode, comprising said alloy or mixture of tungsten and a coinage metal, and a cathode. The electrolyte solution is maintained substantially free of dissolved tungsten during the electrowinning process by contacting the electrolyte solution with an organic extractant solution comprising an inert solvent and a quaternary alkyl ammonium or quaternary alkyl phosphonium salt to selectively remove tungsten from the electrolyte and to deposit the coinage metal at the cathode in a form substantially free of tungsten contamination.

BRIEF DESCRIPTION OF THE DRAWING

The sole drawing FIGURE is a schematic representation of the process in accordance with the present invention.

For a better understanding of the present invention, together with other and further objects, advantages, and capabilities thereof, reference is made to the following disclosure and appended claims in connection with the above-described drawing.

DETAILED DESCRIPTION

Referring to the drawing FIGURE, alloy scrap 40 or other mixture of tungsten and a coinage metal is placed in contact with an anode plate 35 contained in a permeable basket 30 which forms the anode chamber of an electrowinning cell 10. A cathode plate 50 rests on the bottom of an outer chamber 20 which forms the remaining portion of electrowinning cell 10. The cell 10 is filled with an electrolyte solution 25. In the particular embodiment of the present invention wherein the process is employed to separate silver from silver-tungsten alloys or other mixtures, the electrolyte solution 25 comprises a saturated solution of silver nitrate. Anode plate 35 and cathode plate 50 are electrically connected to direct current power source 60.

As current is passed through the electrolyte solution, crystals 45 of the coinage metal deposit at cathode plate 50. Without further treatment in accordance with the process of the present invention, the crystals 45 of coinage metal deposited at the cathode become contaminated with small amounts of tungsten codeposited with the coinage metal. In the particular case where silver is separated from silver-tungsten alloys or other mixtures, the silver deposited at the cathode plate can contain upwards of 2000 ppm contaminating tungsten. This level of tungsten contamination renders the coinage metal unfit for many further applications and may require additional electrowinning steps to produce coinage metal of sufficient purity. However, in accordance with the process of the present invention, the electrolyte solution is maintained substantially free of dissolved tungsten during the electrowinning process by transferring the tungsten loaded electrolyte from the electrowinning cell 10 by means of pump 80 or other transfer means to extraction chamber 90 where the electrolyte solution is contacted with an organic extractant solution 110 to remove a major portion of the tungsten dissolved in the electrolyte solution. Following extraction of a major portion of the tungsten contained in the electrolyte solution into the organic extractant solution, the substantially tungsten-free electrolyte solution 130 is returned to the electrowinning cell.

The organic extractant solution charged to extractor 90 is preferably a solution of a quaternary alkyl ammonium salt or a quaternary alkyl phosphonium salt dissolved in a mixed $\geq C_8$ aromatic hydrocarbon solvent. The solvent may contain additional oxygenated organic compounds such as alcohols as a cosolvent aid. A particularly preferred extractant for use in extractor 90 is Aliquat 336, comprising methyl tricaprylylammonium chloride, available from Minerals Industry Division of Henkel Corporation, Minneapolis, MN.

In the particular embodiment of the present invention where the process is employed to separately recover silver and tungsten from alloys or other mixtures of the two metals, it is preferred that the extractant contained in the organic extractant solution be converted from the normal chloride form to either the nitrate or sulfate form to prevent direct chemical reaction with the silver to be extracted. This is accomplished by repeated washings of the organic extractant solution with successive portions of 3 M nitric acid or 3 M sulfuric acid until the washings indicate the absence of chloride ion.

A preferred solvent is a commercially available hydrocarbon mixture such as SC#150 solvent, a mixture of $\geq C_8$ aromatic hydrocarbons available from Buffalo Solvents and Chemicals Corporation, Buffalo, New York. This preferred extractant solution possesses a high degree of selectivity for transferring tungsten from the electrolyte solution while leaving the major portion of the coinage metal dissolved in the aqueous phase. The tungsten-containing organic phase 140 is next transferred to extractor 100 where the tungsten-containing organic phase is contacted with an aqueous stripping solution 150 in order to recover the tungsten from the organic phase. A preferred aqueous stripping solution comprises 3 M aqueous sodium hydroxide solution or 3 M aqueous sodium carbonate solution. The aqueous extractant or stripping solution removes the tungsten from the organic phase in the form of sodium tungstate solution from which the tungsten may be subsequently recovered. The substantially tungsten-free organic extractant solution 160 is returned to extractor 90 in the cyclical process.

Employing the process of the present invention, the tungsten level in electrolyte solution 25 of electrowinning cell 10 is maintained below about 50 ppm. Under these conditions, the coinage metal deposited at cathode 50 contains less than 50 ppm contaminating tungsten. In the particular case of separation of silver from silver-tungsten containing alloys, silver has been recovered in a purity exceeding 99.995%.

Removal of the tungsten from the electrolyte solution 25 may be by the batch mode in which the electrolyte 25 is removed from cell 10 and contacted with the organic extractant solution when the tungsten concentration in the electrolyte solution becomes unacceptably high, or by the continuous mode in which the electrolyte solution 25 is continuously contacted with the organic extractant solution, for example in a counter-current extraction chamber. It has been found that the coinage metal deposited at the cathode tends to become contaminated with unacceptable levels of tungsten even in situations where the tungsten concentration in the electrolyte solution is quite low. For this reason, the continuous mode of the process of this invention is preferred.

The process of the present invention thus provides an efficient means of cleanly separating tungsten and coinage metals from alloys or other mixtures of the two. In a single electrowinning step employing the process of this invention it is possible to obtain coinage metals of sufficient purity for use in subsequent manufacturing processes without additional processing. In order to enable one skilled in the art to practice the present invention, the following examples are provided. However, it is to be understood that the examples are merely illustrative of the invention and are not to be construed as limiting the scope of the invention as defined in the appended claims.

EXAMPLE

Methyl tricaprylylammonium chloride (Aliquat 336®, General Mills, Chemical Division, Minneapolis, MN) was converted to the sulfate form by repeated treatment with 1.5 M $H_2SO_4$ until the acid wash indicated the absence of chloride ion. An extractant solution of 2.7 g of methyl tricaprylylammonium bisulfate in 100 ml of SC#150 solvent was prepared. A 25 ml portion of this extractant solution was shaken with 125 ml of an aqueous solution containing 0.490 g/l tungsten and 45.43 g/l of silver. After separation of the organic and aqueous phases, the two phases were separately analyzed for silver and tungsten content. The silver concentration in the aqueous phase was found to be virtually unchanged, while the tungsten in the extracted aqueous phase was found to be less than 0.12% of the amount initially present, indicating almost quantitative transfer of the tungsten to the organic extractant solution.

The recyclability of the organic extractant solution was tested by contacting the tungsten-containing extractant solution with a fresh 125 ml portion of the tungsten-silver containing aqueous solution. In this second extraction cycle, the tungsten extraction into the organic phase was again essentially quantitative with very little silver being removed from the aqueous phase.

The tungsten was recovered from the organic extractant solution by contacting the extractant with an aqueous solution of sodium hydroxide.

While there has been shown and described what is at present considered the preferred embodiments of the invention, it will be obvious to those skilled in the art that various changes and modifications may be made therein without departing from the scope of the invention as defined by the appended claims.

What is claimed is:

1. A process for separately recovering tungsten and a coinage metal from alloys or mixtures thereof comprising electrowinning said coinage metal from an aqueous nitrate electrolyte solution contained in an electrowinning cell having an anode, comprising said alloy or mixture of tungsten and a coinage metal, and a cathode; wherein the electrolyte solution is maintained essentially free of dissolved tungsten by contacting, in a chamber separate from said electrowinning cell, said electrolyte solution with an organic extractant solution comprising an inert solvent and a quaternary alkylammonium salt or a quaternary alkylphosphonium salt to selectively remove a portion of the tungsten from said electrolyte solution and to deposit said coinage metal at the cathode of said electrowinning cell in a form substantially free of tungsten contamination; and separately recovering said selectively removed portion of tungsten from said organic extractant solution.

2. A process in accordance with claim 1 wherein said quaternary alkylammonium salt comprises methyl tricaprylylammonium nitrate.

3. A process in accordance with claim 1 wherein said quaternary alkylammonium salt comprises methyl tricaprylylammonium sulfate.

4. A process in accordance with claim 1 wherein said electrolyte solution is removed from said electrowinning cell, contacted with said organic extractant solution in said separate chamber to remove a portion of the tungsten therefrom, and returned to said cell in a continuous process during the electrowinning of said coinage metal to maintain the tungsten concentration in said electrolyte solution below about 50 parts per million.

5. A process in accordance with claim 4 wherein said coinage metal is silver.

6. A process in accordance with claim 5 wherein said silver deposited at the cathode of said electrowinning cell contains less than about 50 parts per million contaminating tungsten.

7. A process in accordance with claim 1 wherein said separately removed portion of tungsten is recovered by contacting said organic extractant solution, when loaded with tungsten values from said electrolyte solution, with an aqueous stripping s-lution to transfer a portion of said tungsten values from said loaded organic extractant solution to said aqueous stripping solution, and thereafter recovering said tungsten values from said aqueous stripping solution.

8. A process in accordance with claim 7 wherein said aqueous stripping solution comprises sodium hydroxide or sodium carbonate.

* * * * *